(12) United States Patent
Yackley et al.

(10) Patent No.: US 12,177,375 B2
(45) Date of Patent: *Dec. 24, 2024

(54) ROTARY PHONE RECORDING DEVICE

(71) Applicant: After the Tone, LLC, San Clemente, CA (US)

(72) Inventors: Jacob Yackley, San Clemente, CA (US); Matthew Rullo, Patchogue, NY (US)

(73) Assignee: After the Tone, LLC, San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,002

(22) Filed: Dec. 13, 2023

(65) Prior Publication Data

US 2024/0114084 A1 Apr. 4, 2024

Related U.S. Application Data

(63) Continuation of application No. 18/302,104, filed on Apr. 18, 2023, now Pat. No. 11,882,230, which is a
(Continued)

(51) Int. Cl.
*H04M 1/658* (2006.01)
*H02J 7/00* (2006.01)
*H04M 1/72433* (2021.01)

(52) U.S. Cl.
CPC ........... *H04M 1/658* (2013.01); *H02J 7/0045* (2013.01); *H02J 7/0048* (2020.01); *H04M 1/72433* (2021.01)

(58) Field of Classification Search
CPC .. H04M 1/658; H04M 1/72433; H04M 1/247; H04M 2250/06; H02J 7/0045; H02J 7/0048
See application file for complete search history.

(56) References Cited

U.S. PATENT DOCUMENTS 3,284,578 A * 11/1966 Evans .................. H04M 1/677
379/362
3,358,087 A * 12/1967 Von Stein ............. H04M 1/677
379/362
(Continued)

FOREIGN PATENT DOCUMENTS

JP H11331373 11/1999

*Primary Examiner* — Farid Seyedvosoghi
(74) *Attorney, Agent, or Firm* — Concourse Law Group; Katherine B. Sales, Esq.

(57) ABSTRACT

A recording device comprising a base, a top cover, at least one computer with a wi-fi dongle coupled to the base that is configured to automatically upload a .zip file of the audio files to a cloud network when the device is turned on and in range of a preferred wifi network, a hook switch coupled to the base, and electrically coupled to the computer, at least one rechargeable battery electrically coupled to the computer, an LED that indicates battery charge electrically coupled to the computer, at least one USB-A connector electrically coupled to the computer for charging the power source, a rotary dial coupled to the base and configured to extend through an opening in the top cover, a power button electrically coupled to the computer, and a handset removably supported by the top cover and electrically coupled to the computer.

18 Claims, 6 Drawing Sheets

Related U.S. Application Data continuation of application No. 18/169,665, filed on Feb. 15, 2023, which is a continuation-in-part of application No. 17/831,402, filed on Jun. 2, 2022, now Pat. No. 11,611,645.

(60) Provisional application No. 63/196,566, filed on Jun. 3, 2021.

(56) References Cited

U.S. PATENT DOCUMENTS

| | | | | |
|---|---|---|---|---|
| 3,511,939 | A | * | 5/1970 | Aikawa ............... H04M 1/677 |
| | | | | 379/362 |
| 3,515,806 | A | * | 6/1970 | Spraker ............... H04M 11/066 |
| | | | | 379/444 |
| 3,525,821 | A | * | 8/1970 | Pulles ................... H04M 1/31 |
| | | | | 379/370 |
| 3,748,402 | A | | 7/1973 | Yussen |
| D713,725 | S | | 9/2014 | Cedeno |
| D714,149 | S | | 9/2014 | Cedeno |
| D766,718 | S | | 9/2016 | Beckers et al. |
| D769,718 | S | | 10/2016 | Houdijk et al. |
| D774,393 | S | | 12/2016 | Wu |
| D889,967 | S | | 7/2020 | Glass et al. |
| 2002/0110224 | A1 | | 8/2002 | Kovales et al. |
| 2008/0276168 | A1 | | 11/2008 | Mansfield et al. |
| 2010/0260247 | A1 | | 10/2010 | Albiston et al. |
| 2013/0287400 | A1 | | 10/2013 | Hurwitz et al. |
| 2019/0141800 | A1 | | 5/2019 | Rhodes |

* cited by examiner

ROTARY PHONE RECORDING DEVICE

CROSS-REFERENCE TO RELATED APPLICATIONS

This application is a continuation of U.S. patent application Ser. No. 18/302,104, titled "Rotary Phone Recording Device," filed Apr. 18, 2023, which is continuation of Ser. No. 18/169,665, titled "Rotary Phone Recording Device," filed Feb. 15, 2023, which is a continuation-in-part of U.S. patent application Ser. No. 17/831,402, titled "Rotary Phone Recording Device," filed Jun. 2, 2022, which claims priority to U.S. Patent Application No. 63/196,566, titled "Rotary Phone Recording Device," filed Jun. 3, 2021, the contents of which are incorporated by reference herein in their entirety.

BACKGROUND

It has become popular to provide a guestbook at certain events, such as weddings, birthday parties, anniversaries, etc. for the guests to leave notes and well wishes to the host. However, having to actually handwrite a note or well wish can be a deterrent for some guests.

Accordingly, there is a need for recording device that allows guests to leave notes and well wishes without having to actually write them out.

SUMMARY

The present invention addresses this need. The present invention is directed to a recording device having a base, a top cover, at least one computer, a hook switch, at least one power source, a rotary dial, and a handset.

The base has an upper surface and a lower surface, and the top cover is removably coupled to the base.

Optionally, the top cover has an internal surface, an external surface, a central opening, and at least one support.

Optionally, the computer has a wi-fi dongle coupled thereto that allows the computer to automatically upload a .zip file of the audio files to a cloud network when the device is turned on and in range of a preferred wifi network.

The hook switch is coupled to the upper surface of the base and is electrically coupled to the computer.

The handset is removably supported by the top cover and electrically coupled to the terminal network by a telephone wire.

The power source can be at least one battery, rechargeable or not, and the device can have at least one USB-A connector electrically coupled to the computer for charging the power source.

Optionally, the handset has a first end that contains a microphone, a second end that contains a speaker, and a central handle portion disposed between the two ends.

The rotary dial is coupled to the base and can be configured to extend through an opening of the top cover.

Optionally, the device can have a power button electrically coupled to the computer for turning the device on and off.

The handset is removably supported by the top cover and electrically coupled to the computer. The handset has at least one end that contains a microphone, and a central handle portion.

Optionally, the device has a light (preferably an LED) that indicates the charge level of the power source.

A method of using the recording device comprises the steps of: a) providing the device; b) lifting the handset from the device; and c) speaking into the handset to leave a message.

BRIEF DESCRIPTION OF THE DRAWINGS

These and other features, aspects, and advantages of the present invention will become better understood with regard to the following description, appended claims, and accompanying drawings.

DESCRIPTION

Figure 1:
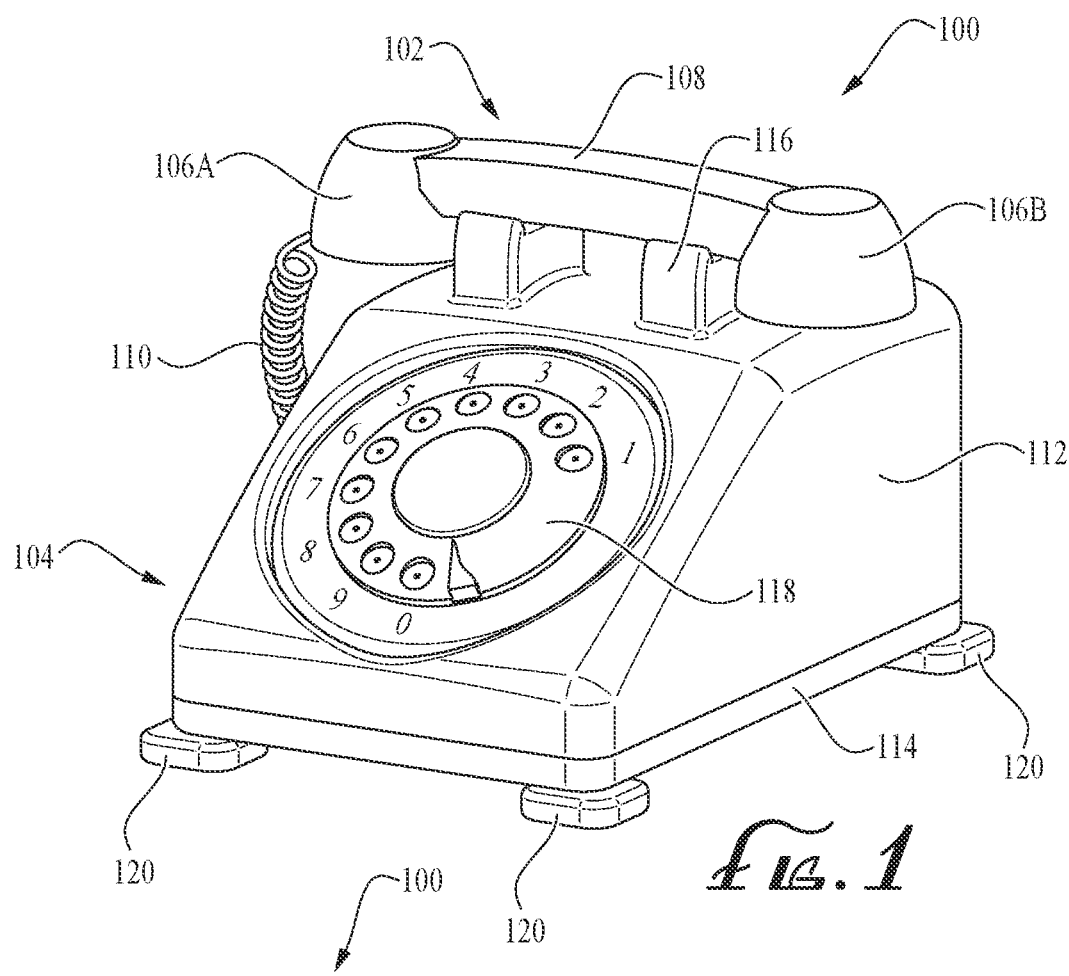
FIG. 1 is a front perspective view of a first embodiment of a rotary phone recording device having features of the present invention.
Figure 2:
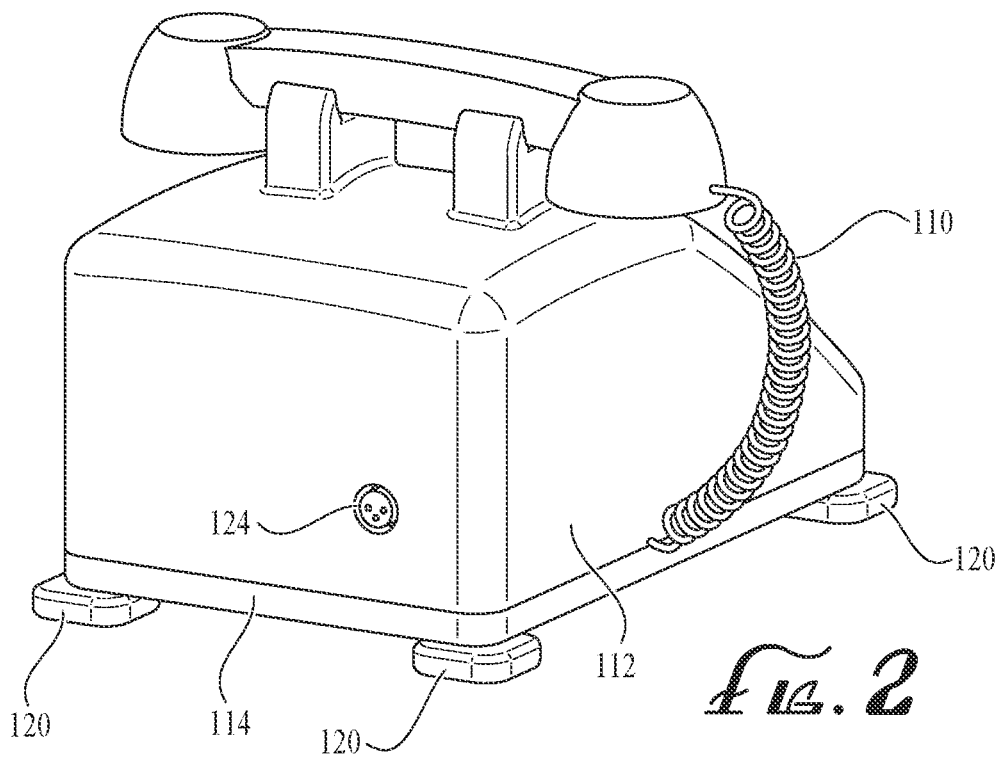
FIG. 2 is a rear perspective view of the recording device of FIG. 1.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

The terms "computer," "computer device," and "server" as used herein, refers to a device and/or system of devices that include at least one computer processing element, e.g., a central processing unit (CPU), and some form of computer memory having a capability to store data. The computer may comprise hardware, software, and firmware for receiving, storing, and/or processing data as described below. For example, a computer or computer device may comprise any of a wide range of digital electronic devices, including, but not limited to, a server, a desktop computer, a laptop, a smart phone, a tablet, or any form of electronic device capable of functioning as described herein.

The term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to FIG. 1 through 4, the invention is directed to a recording device 100. The recording device 100 has a handset 102 and a body 104. The handset 102 is preferably in the shape of an old telephone handle, having two ends 106 coupled by a handle portion 108. As is typical with an old telephone handle, one of the ends 106A contains a microphone into which a user speaks, and the other end 106B contains a speaker which projects sound and to which the user listens.

The handset 102 is coupled to the body 104 via a telephone wire 110. The wire 110 electrically couples the internal components of the handset (microphone and speaker) to at least one internal component of the body 104. The body 104 comprises a top cover 112 and a base 114, which are removably coupled to each other. The top cover 112 has an internal surface and an external surface, and the base 114 has an upper surface and a lower surface. There is at least one support 116 coupled to the external surface of the top cover 112 for supporting the handset 102. Preferably, the body 104 also comprises a rotary dial 118 that extends through an opening in the top cover 112, which adds to the nostalgia of the device 100. Optionally, the device 100 can comprise one or more feet 120 coupled to the lower surface of the base 114.

Figure 3:
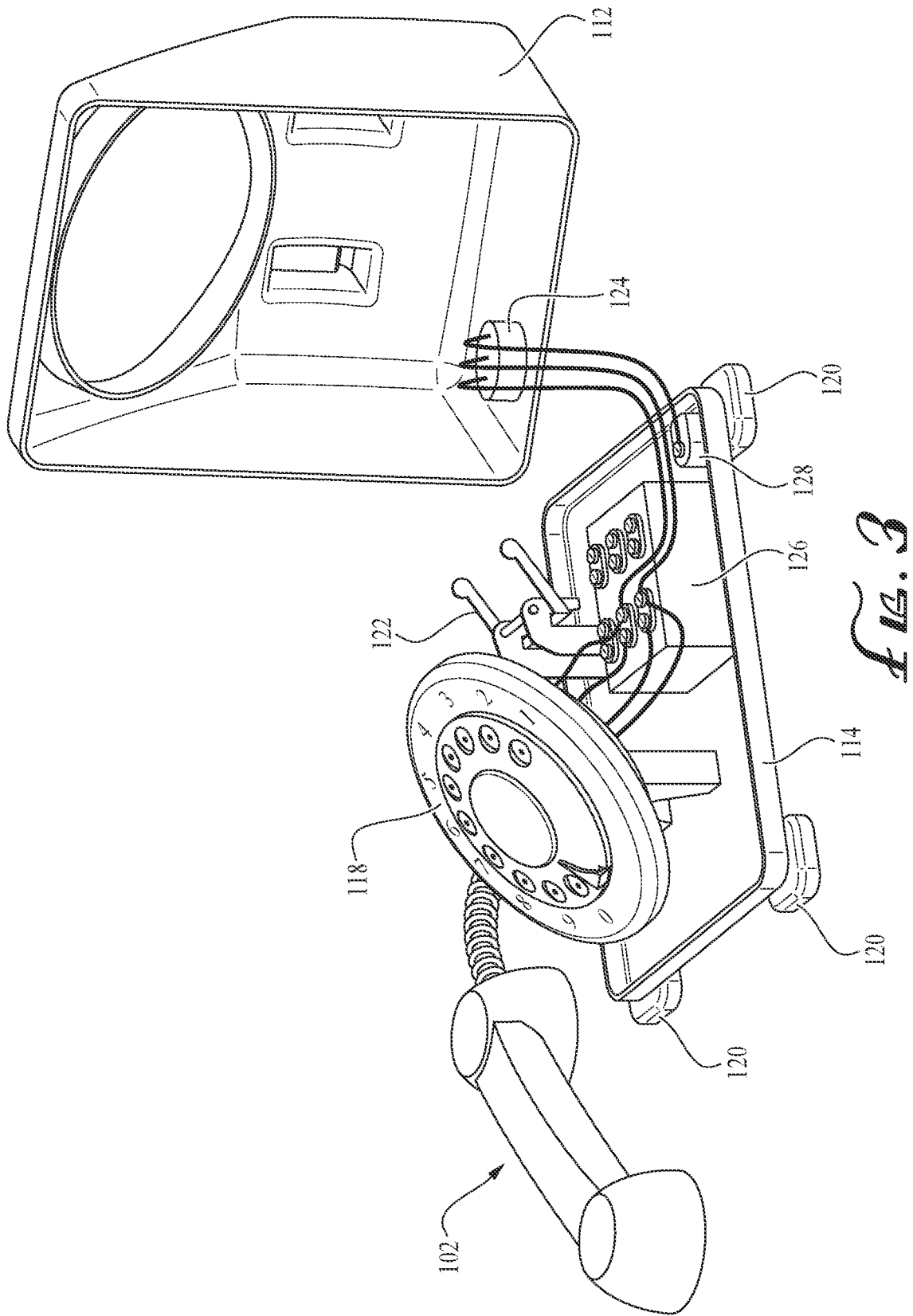
FIG. 3 is a front perspective view of the device of FIG. 1, wherein a top of the device has been removed, and internal components of the device are shown.
Figure 4:
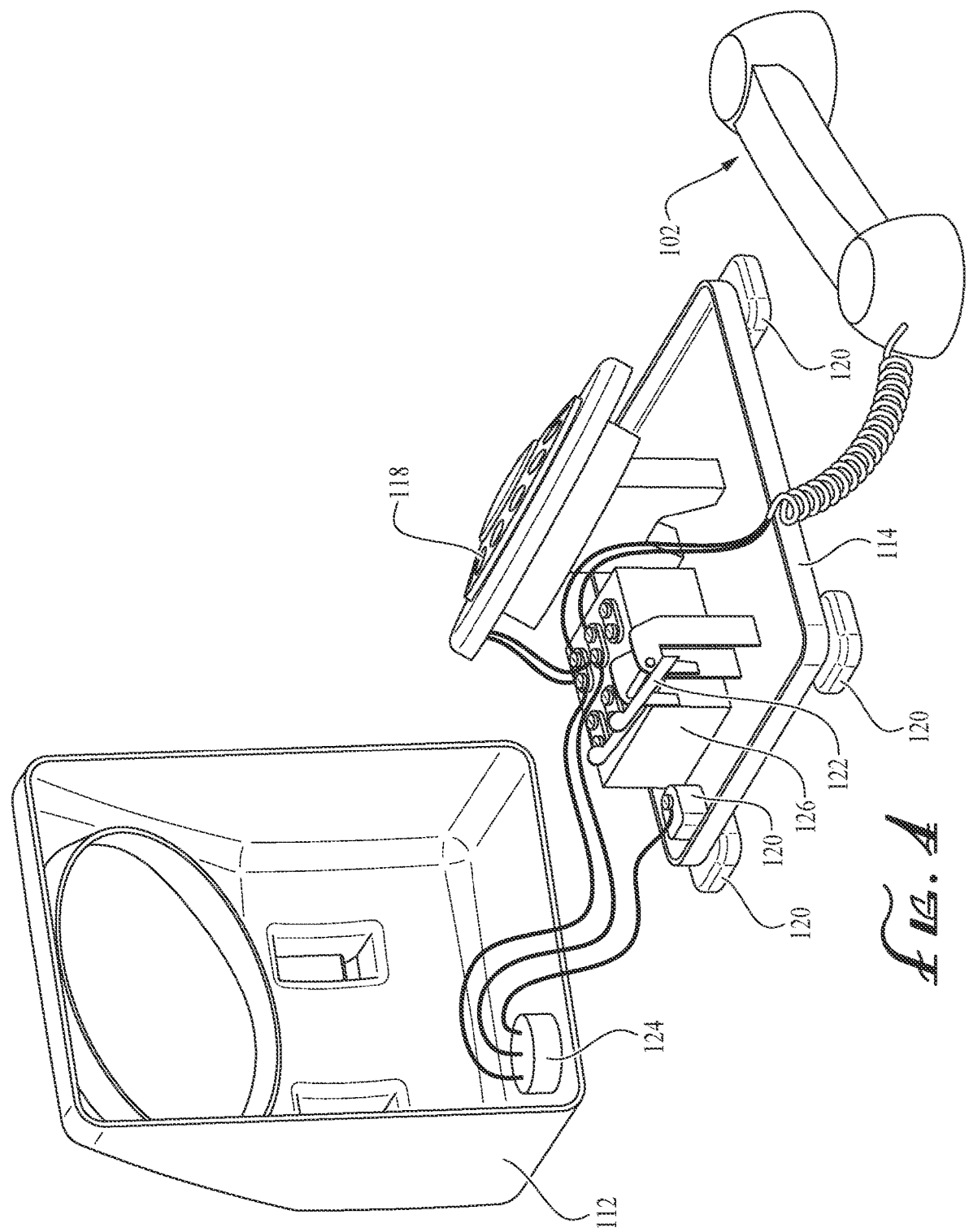
FIG. 4 is a rear perspective view of the device of FIG. 3

Referring now to FIGS. 3 and 4, the internal components of the device 100 can be seen. As noted above, the body 104 comprises a top cover 114 and a base 116. The upper surface of the base 116 supports the internal components of the device 100. Those internal components comprise a hook switch 122, a terminal network 126, and a ground lug 128. An XLR connector 124 is coupled to the integral surface of the top cover 112.

The hook switch 122 is an electrical switch that indicates when the handset 102 is hung up. The hook switch 122 extends into the supports 116 that support the handset 102. When the handset 102 is lifted off the supports 116, the hook switch 122 is triggered and a pre-recorded audio recording is played. After the audio recording is played, the handset 102 then switches into recording mode and records whatever the user says into the handset 102. The hook switch 122 is physically mounted on the upper surface of the base 114 and is electrically coupled to the terminal network 126.

The XLR connector 124 is physically coupled to the internal surface of the upper cover 112 and is electrically coupled to the terminal network 126. The XLR connector 124 is a type of electrical connector primarily found on professional audio, video, and stage lighting equipment. The connector 124 is circular in design and has between three and seven pins. The XLR connector 124 utilizes an XLR cable (not shown) to connect the device 100 to an external recorder and/or data storage device (not shown). Optionally, instead of an XLR connector, a ¼ inch jack or a 3.5 mm jack could be used instead.

The external recorder and/or data storage device can be, but is not limited to, an external hard drive, a computer, cloud-based storage, a tablet, a cell phone, a device that hold computer memory, a USB drive, and a recorder comprising an SD card. The data storage device stores all of the messages left by users using the device 100. Optionally, a telephone handset recording USB adapter can be used to record the messages and send the recorded audio to a computer via USB.

The terminal network 126 is the electrical hoard/circuitry that receives and transmits the audio input from the guest to the external recorder. The terminal network is electrically coupled to the handset 102 by a telephone wire.

Optionally, instead of the terminal network, an Arduino chip can be used, and Arduino chip can be programed such that when the handset is lifted and the rotary dial is rotated, the device 100 plays a prompt and then begins to record using a small audio interface.

The ground lug 128 is physically coupled to/mounted on the upper surface of the base 114 and electrically coupled to the XLR connector 124. The ground lug is a lug that connects a grounding conductor to a grounding electrode and grounds the device 100, preventing a short.

In use, the device 100 is placed at a location that is easily accessible by the guests at an event. When a guest chooses to leave a message or well-wish to the hosts, the guest simply lifts the handset 102 off the supports 116 then speaks into the handset 102 leaving a message which the device 100 records and saves.

Referring now to FIG. 5 through 8, the invention is directed to a recording device 500. Similar to the first embodiment, the recording device 500 has a handset 502 and a body 504. The handset 502 is preferably in the shape of an old telephone handle, having two ends 506 coupled by a handle portion 508. As is typical with an old telephone handle, one of the ends 506A contains a microphone into which a user speaks. Optionally, the other end 506B can contain a speaker which projects sound and to which the user listens.

The handset 502 is coupled to the body 504 via at least one wire 510. The wire 510 electrically couples the internal components of the handset (microphone and speaker) to at least one internal component of the body 504. Optionally, the wire 510 comprises three individual wires therein, as best seen in FIG. 8.

Similar to the first embodiment, the body 504 comprises a top cover 512 and a base 514, which are removably coupled to each other. The top cover 512 has an internal surface and an external surface, and the base 514 has an upper surface and a lower surface. There is at least one support 516 coupled to the external surface of the top cover 512 for supporting the handset 502. Preferably, the body 504 also comprises a rotary dial 518 that extends through an opening in the top cover 512, which adds to the nostalgia of the device 500. Optionally, the device 500 can comprise one or more feet 520 coupled to the lower surface of the base 514.

Figure 5:
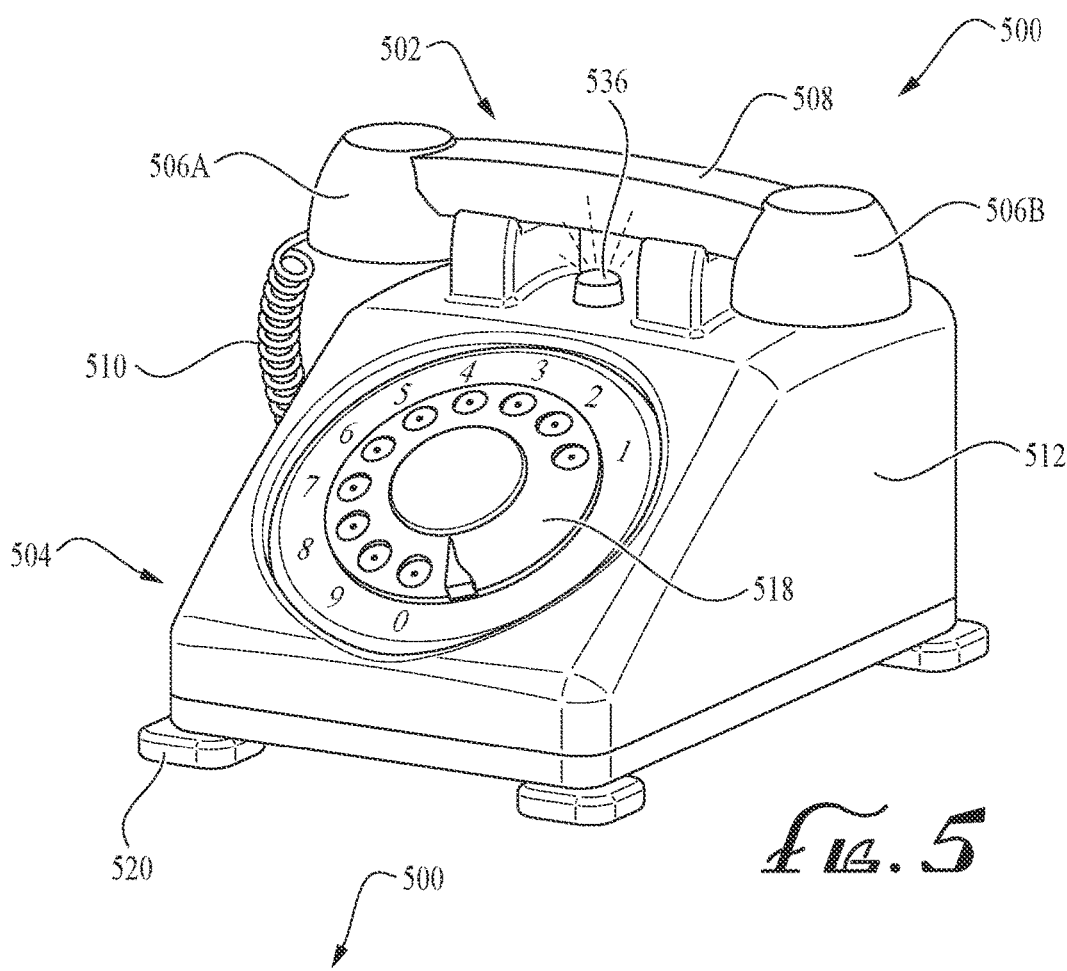
FIG. 5 is a front perspective view of a second embodiment of a rotary phone recording device having features of the present invention.
Figure 6:
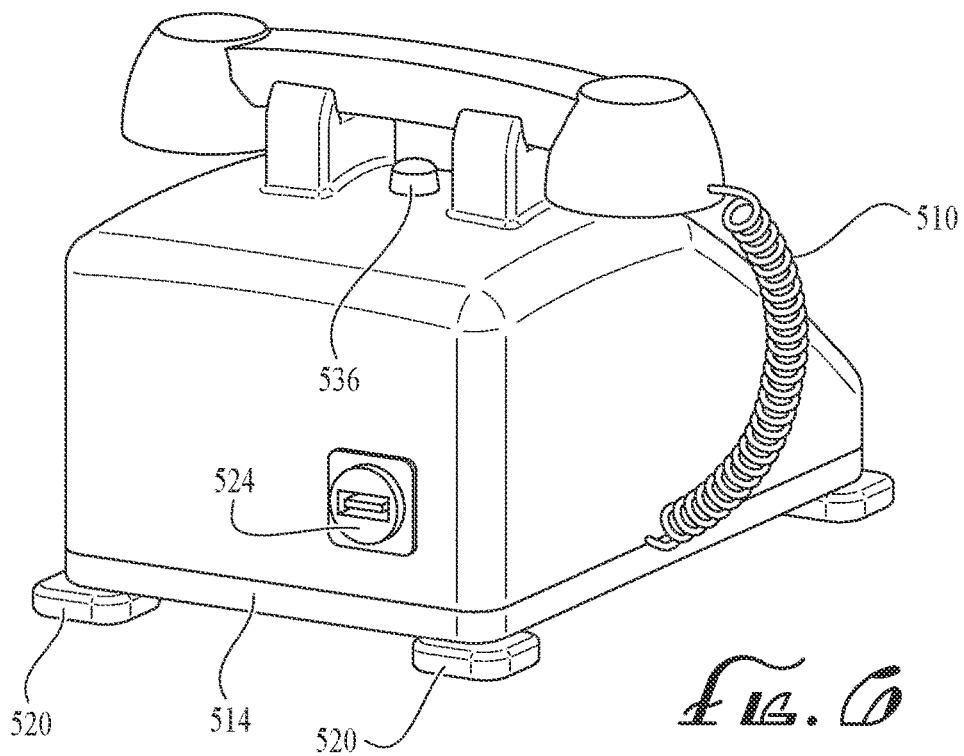
FIG. 6 is a rear perspective view of the recording device of FIG. 5.
Figure 8:
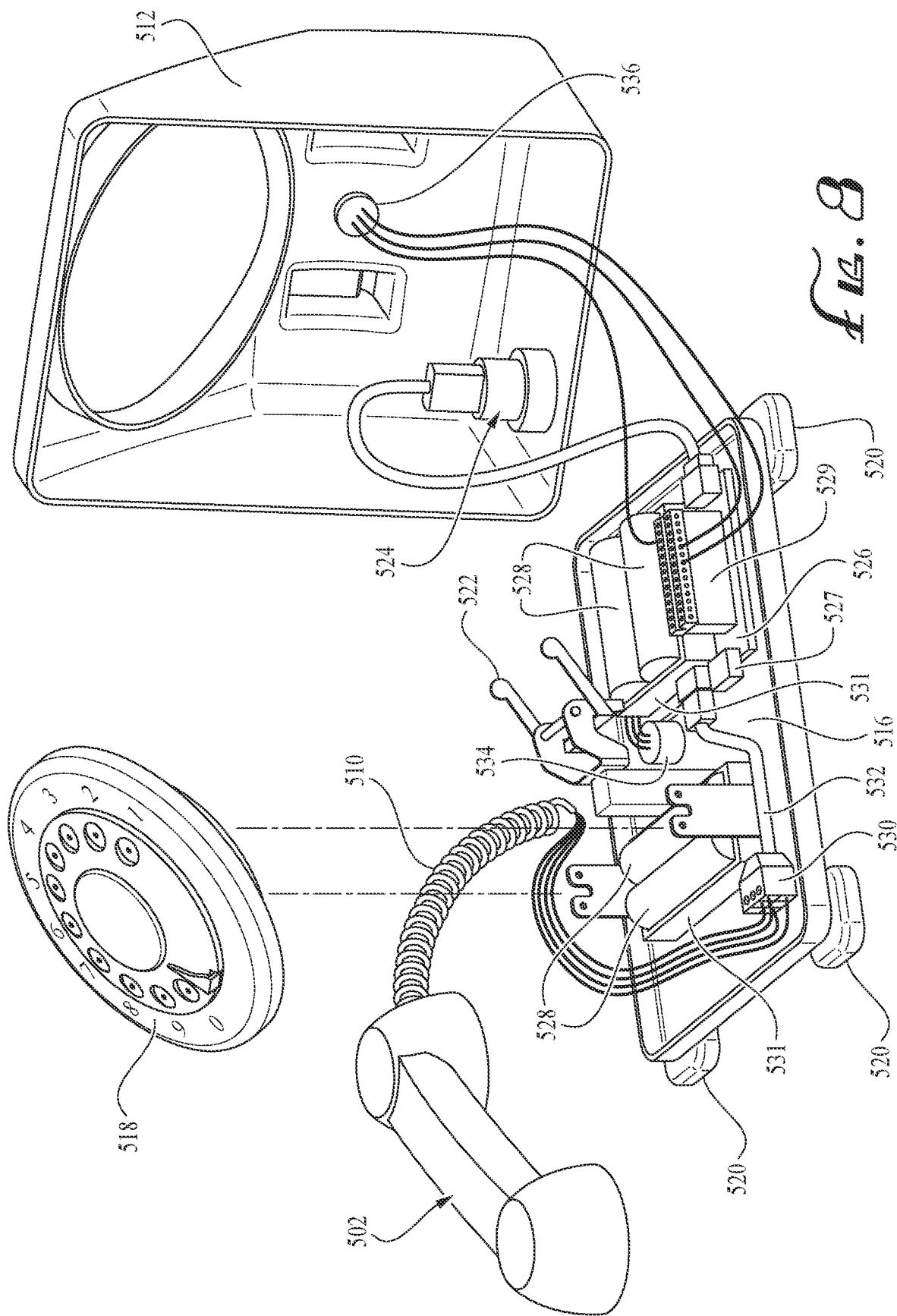
FIG. 8 is a front perspective view of the device of FIG. 5, wherein a top of the device has been removed, and internal components of the device are shown.

Referring now to FIG. 8, the internal components of the device 500 can be seen. As noted above, the body 504 comprises a top cover 52 and a base 516. The upper surface of the base 516 supports the internal components of the device 500. Those internal components comprise a hook switch 522, a computer 526, and at least one power source 528 (in this case four rechargeable lithium-ion batteries, although any type and number of battery, rechargeable or not, can be used). An USB A connector 524 is coupled to the internal surface of the top cover 512 and extends therethrough to the external surface of the cover 512 so that it can be accessed from outside the device 500. There can be a light source 536, preferably an LED, coupled to the device 500. Preferably, the LED 536 is on either the back of the device 500 or top of the device 500, as shown in FIGS. 5-6.

The handset 502 is electrically coupled to various internal components by the wire 510. Wire 510 can comprise a typical 4-wire telephone wire that is standard in traditional telephones. The wire 510 is coupled to an analog to digital converter 530 (optionally, one or more 3.5 MM stereo male to AV-3 screw terminal block adapter) and the converter 530 is coupled to the computer 526 by a USB connector 532 (optionally, a USB to audio jack soundcard adapter).

The computer 526 is the electrical board/circuitry that receives and transmits the audio input from the guest, and controls all electronics in the device 500. Optionally, the computer 526 is a "Banana Pi" single board computer. The computer 526 automatically uploads a .zip file of the audio files left by the guests to the cloud when the device 500 is turned on and in range of a preferred Wi-Fi network via one or more Wi-Fi dongles 527. Coupled to the top of the computer 526 is at least one GPIO breakout board module 529 which allows the connection of the LED 536 to the computer 526.

The batteries 528 are coupled to the computer 526 via one or more X728 power management and UPS boards 531.

The hook switch 522 is the electrical switch that indicates to the computer 526 when the handset 502 is lifted off the device 500 and when the handset 502 is hung up. As with the first embodiment, the hook switch 522 is electrically coupled to the computer 526 and physically extends into the supports 516 that support the handset 502. When the handset 502 is lifted off the supports 516, the hook switch 522 causes the handset 502 to switch into recording mode and records whatever the user says into the handset 502. When the handset 502 is placed back on the hook switch 522, the computer 526 stops recording.

As noted above, the USB-A connector 524 is physically coupled to the internal surface of the upper cover 512 and is electrically coupled to the computer 526, which is then electrically coupled to the batteries 528. The USB-A connector 524 is used to charge the batteries 524.

The LED 536 is electrically coupled to the computer 526 and indicates how much charge is in the batteries 528 by either a green light for full or substantially full charge, a yellow light for medium charge, and a red light for no charge.

Figure 7:
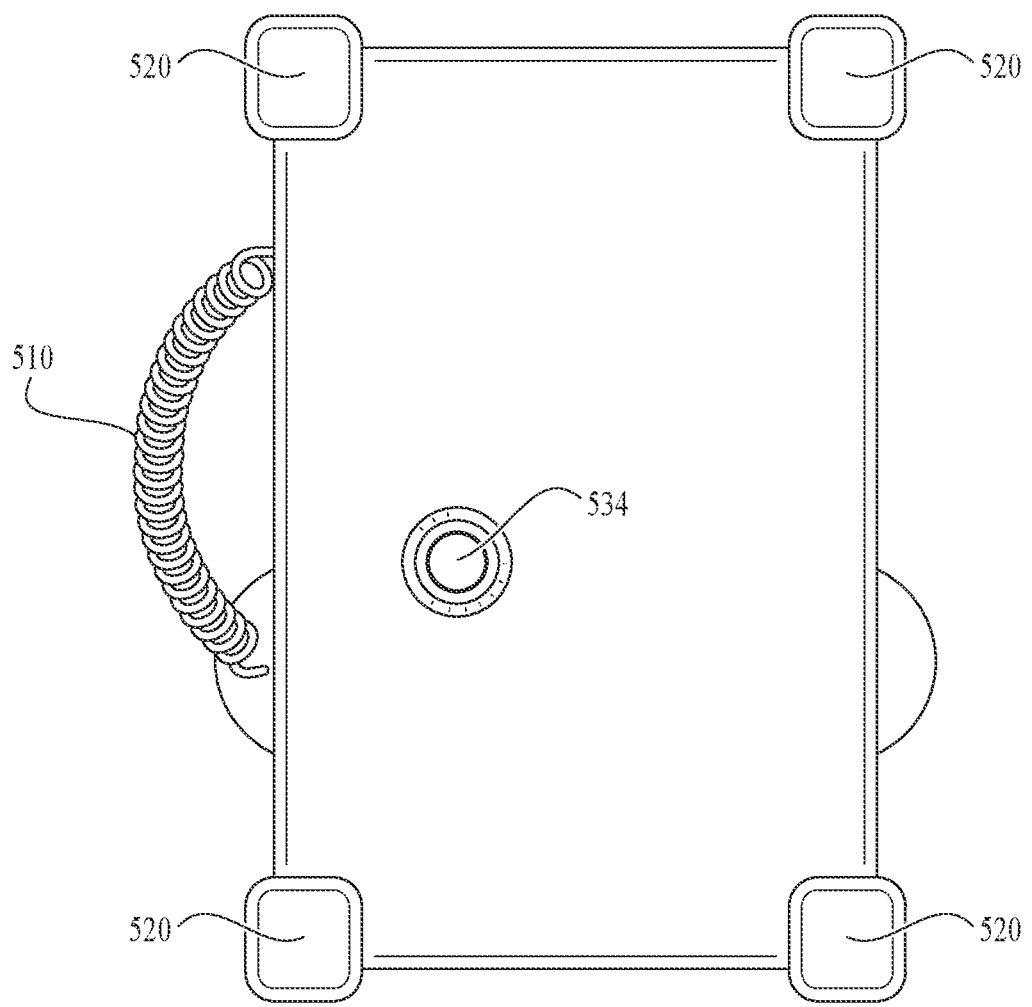
FIG. 7 is a bottom plan view of the recording device of FIG. 5.

There is a power button 534 on the bottom 516 of the device 500, which can be best seen in FIG. 7. The power button 534 is electrically coupled to the computer 526 and can be used by the user to turn the device 500 on and off.

In use, similar to the first embodiment, the device 500 is placed at a location that is easily accessible by the guests at an event. When a guest chooses to leave a message or well-wish to the hosts, the guest simply lifts the handset 502 off the supports 516 then speaks into the handset 502 leaving a message which the device 500 records and automatically uploads to the cloud as noted above.

Guests no longer have to physically write messages/sign guest books with a pen and paper. Instead, the guests can simply talk into the device 100, 500 and leave an audio message for their hosts.

The device 100, 500 also permits the guests to leave more personal messages, as the messages are recorded and saved into the device 100, 500 and cannot be publicly listened to at the event. In contrast, if a guest were to leave a message for the hosts via pen and paper in a guest book, the message would be available for viewing by all the other guests as the guest book can be easily flipped through and its contents read. Accordingly, the device 100, 500 of the present invention provides increased privacy and intimacy between the guests and their hosts when leaving messages.

The device 100, 500 also provides an increased level of fun and interaction between the guests. It can be more enjoyable to leave an audio message than to handwrite a message. Moreover, guests can easily convey tone and other emotions when leaving an audio message. Tone and emotion can be difficult to convey via a written message.

Optionally, a Bluetooth gateway could be used to control a cell phone or other wireless tele device. A Bluetooth gateway is a low-power device that connects smart devices to Bluetooth-based products when nearby. It enables one to transmit information from Bluetooth devices to the cloud. These devices can either be sensors or Bile beacons. A virtual phone number could be set up for a customer (the party to which the voicemails are to be sent to you), and the device 100, 500 can be used to control the cell phone and call the custom number. Recordings can be saved in the cloud.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

Features of the invention include:
1. A recording device comprising:
    a) a base having an upper surface and a lower surface;
    b) a top cover having an internal surface and an external surface, the top cover being removably coupled to the base;
    c) a handset removably supported by the top cover;
    d) a plurality of feet coupled to the lower surface of the base for supporting the device;
    e) a terminal network coupled to the upper surface of the base;
    f) a hook switch coupled to the upper surface of the base, and electrically coupled to the terminal network;
    f) an XLR connector coupled to the internal surface of the top cover, and electrically coupled to the terminal network; and
    h) a ground lug coupled to the upper surface of the base, and electrically coupled to the XLR connector.

What is claimed is:
1. A recording device comprising:
a) a base having an upper surface and a lower surface;
b) a top cover removably coupled to the base;
c) at least one computer with a wi-fi dongle that is configured to automatically upload a .zip file of one or more audio files to a cloud network when the device is turned on and in range of a preferred wi-fi network;
d) a hook switch coupled to the upper surface of the base, and electrically coupled to the computer;
e) at least one rechargeable battery electrically coupled to the computer;
f) at least one Universal Serial Bus Type A (USB-A) connector electrically coupled to the computer for charging the power source;
g) a rotary dial coupled to the base and configured to extend through an opening in the top cover;
h) a power button electrically coupled to the computer; and
i) a handset removably supported by the top cover and electrically coupled to the computer, the handset having:
   i) at least one end that contains a microphone; and
   ii) a handle portion.

2. A recording device comprising:
a) a base;
b) at least one computer coupled to the base;
c) a hook switch coupled to the base and electrically coupled to the computer;
d) at least one power source electrically coupled to the computer;
e) at least one Universal Serial Bus Type A (USB-A) connector electrically coupled to the computer for charging the power source; and
f) a handset electrically coupled to the computer, the handset having:
   i) at least one end that contains a microphone; and
   ii) a handle portion.

3. The device of claim 2, wherein the computer has a wi-fi dongle coupled thereto.

4. The device of claim 2, wherein the power source is at least one battery.

5. The device of claim 4, wherein the battery is rechargeable and the USB-A connector is configured for charging the battery.

6. The device of claim 4, further comprising a light that is electrically coupled to the computer and indicates a charge level of the battery.

7. The device of claim 6, wherein the light is a Light Emitting Diode (LED).

8. The device of claim 2, further comprising a power button electrically coupled to the computer.

9. A recording device comprising:
a) a base having an upper surface and a lower surface;
b) at least one computer coupled to the upper surface of the base;
c) a hook switch coupled to the upper surface of the base, and electrically coupled to the computer;
d) at least one power source electrically coupled to the computer;
e) a rotary dial coupled to the base; and
f) a handset electrically coupled to the computer.

10. The device of claim 9, wherein the computer has a wi-fi dongle coupled thereto.

11. The device of claim 9, wherein the power source is at least one battery.

12. The device of claim 11, wherein the battery is rechargeable and the device comprises a Universal Serial Bus Type A (USB-A) connector coupled to the computer for charging the battery.

13. The device of claim 11, further comprising a light that is electrically coupled to the computer and indicates a charge level of the battery.

14. The device of claim 13, wherein the light is a Light Emitting Diode (LED).

15. The device of claim 9, further comprising a power button electrically coupled to the computer.

16. A method of using a recording device, the method comprising the steps of:
a) providing the device of claim 1;
b) lifting the handset from the device; and
c) speaking into the handset to leave a new message.

17. A method of using a recording device, the method comprising the steps of:
a) providing the device of claim 2;
b) lifting the handset from the device; and
c) speaking into the handset to leave a new message.

18. A method of using a recording device, the method comprising the steps of:
a) providing the device of claim 9;
b) lifting the handset from the device; and
c) speaking into the handset to leave a new message.

* * * * *